United States Patent
Freen et al.

[11] Patent Number: 5,959,985
[45] Date of Patent: Sep. 28, 1999

[54] MULTI-NETWORK ARCHITECTURE

[75] Inventors: Russ Freen; Vish Raju, both of Kanata, Canada

[73] Assignee: Newbridge Networks Corporation, Kanata, Canada

[21] Appl. No.: 08/809,325

[22] PCT Filed: Sep. 19, 1995

[86] PCT No.: PCT/CA95/00526

§ 371 Date: May 13, 1997

§ 102(e) Date: May 13, 1997

[87] PCT Pub. No.: WO96/09726

PCT Pub. Date: Mar. 28, 1996

[30] Foreign Application Priority Data

Sep. 19, 1994 [CA] Canada .................................. 2132364

[51] Int. Cl.⁶ .................................................. H04L 12/28
[52] U.S. Cl. ............................................ 370/351; 370/410
[58] Field of Search ...................................... 370/351, 357, 370/360, 401, 410, 522

[56] References Cited

U.S. PATENT DOCUMENTS 5,600,638 2/1997 Bertin ........................................ 370/351
5,802,316 9/1998 Ito ....................................... 395/200.79

*Primary Examiner*—Chau Nguyen
*Assistant Examiner*—Thinh Vu
*Attorney, Agent, or Firm*—Mark & Clerk

[57] ABSTRACT

A multi-network environment comprises a plurality of different digital networks, a network manager associated with each network, a system manager at each customer premises for requesting a desired service, a customer agent for implementing instructions received from the customer agent, and a call processing unit associated with each network for implementing instructions received from a customer agent to route a call through the networks.

8 Claims, 5 Drawing Sheets

MULTI-NETWORK ARCHITECTURE

This invention relates to the management of digital networks, and more particularly to a multi-network architecture.

A clear trend in networking is for network operators to form consortiums. These consortiums are created as a mechanism to serve customers whose scope of operation is larger than any one network operator. A prime example is Stentor, which was created specifically to offer customers services which are Canada-wide and span the interests of all operating companies within Canada. Perhaps as a consequence of the fact that there are now a large number of network operators, it has become apparent that the ability to provide service management which spans multiple networks is a key requirement.

For example, many network providers are Bell Operating Companies who offer network services to their customers. These customers realize substantial savings by buying networking services from the Bell Operating Companies instead of building their own private networks. For example:

1) They do not have to spend manpower costs maintaining and servicing these networks.
2) They do not have to spend money upgrading/replacing or repairing the physical components that make up the network.
3) They do not have to worry about network planning to ensure that there is always enough bandwidth in the network.

As these networks grow, and the customer base using these networks grows, the service provider is faced with the following factors:

1) Services provided by the service providers are larger in scope than a single network.
2) Many customers require global services.
3) Within the service providers' organizations, many divisions exist that are responsible for parts of the overall service offerings.

A multi-network therefore is a network composed of two or more interconnected networks. Individual networks typically span a geographic area. The interconnections or links between the networks can include almost any networking interface type, such as, T1 or E1 circuits.

The issue to be addressed is that end customers have network end-points in more than one network. Currently, a customer desirous of obtaining a connection from say Ottawa to Vancouver must contact his local network service provider, in this case Bell Canada, and request a connection of desired bandwidth to a particular address in Vancouver. Bell Canada must then route the call through to BCtel, for example, using a Newbridge Networks Corporation® 46020 network manager and advise BCtel that a call is coming in on a certain channel and is destined for a particular customer. BCtel must then use its 46020 network manager to route the incoming call through to the customer. There is no way for the calling customer simply to direct a call through to the called party through a plurality of networks, as is now done in the public telephone network.

From customer's perspective, it would be desirable to see the plurality of networks as a single entity from the point of view of establishing connections as is now the case for users of the switched telephone network where they in essence see all of the world's telephony networks as a single black box.

Even if it were possible to build a single Newbridge Networks Corporation Mainstreet® 46020 network manager capable of handling the entire world, this would be unacceptable to the myriad network operators. What is required administratively is a network architecture that allows networks to interoperate.

The paper OVERVIEW OF AN INTEGRATED NETWORK MANAGEMENT ARCHITECTURE FOR A LARGE HETEROGENEOUS NETWORK, IEEE 1992 NETWORK OPERATIONS AND MANAGEMENT SYMPOSIUM, Session 10, paper 3, vol. 2, Apr. 6, 1992, Memphis, US, pages 279–289; J. M. Veroni discloses a multi-network architecture comprising a plurality of different digital networks with a network management associated with each network, a common network management network, a service manager located at each customer premises and customer agents associated with the service managers. The customer agents include a database including management information. This does not, however, provide a solution to the problem outlined above. An object of the invention is to provide such a solution.

A further object of the invention is to provide network services that span more than one network.

According to the present invention there is provided a multi-network architecture comprising a plurality of different digital networks; a network manager associated with each network; a common management network for said different digital networks; a service manager located at each customer premises comprising an interface responsive to customer input, said service manager issuing instructions to request a desired service across the plurality of networks; a customer agent associated with each service manager and connected to the common management network, each said customer agent including a database containing data about the parts of the networks accessible to its associated customer, and based on said data and instructions received from its service manager, said customer agent issuing routing instructions for the required networks over said common management network; and a call processing unit associated with the network manager of each network, each said call processing unit being connected to the common management network and receiving routing instructions from a said customer agent via said management network; whereby said customer agents can directly route a call through the plurality of networks.

The invention also provides a method of managing calls over multiple networks, each associated with a network manager, comprising the steps of assigning a service manager and customer agent to each customer, said service manager providing a customer interface to permit said customer to request a desired service and said customer agent including a database containing data about the networks accessible to the customer, connecting the customer agents to a common management network spanning said multiple networks, connecting the network managers of said multiple networks to said common management network by means of respective call processing units, and establishing a call through said multiple networks by means of instructions issued over said common management network to said call processing units associated with the network managers thereof.

The invention will now be described in more detail, by way of example only, with reference to the accompanying drawings, in which.

Figure 1:
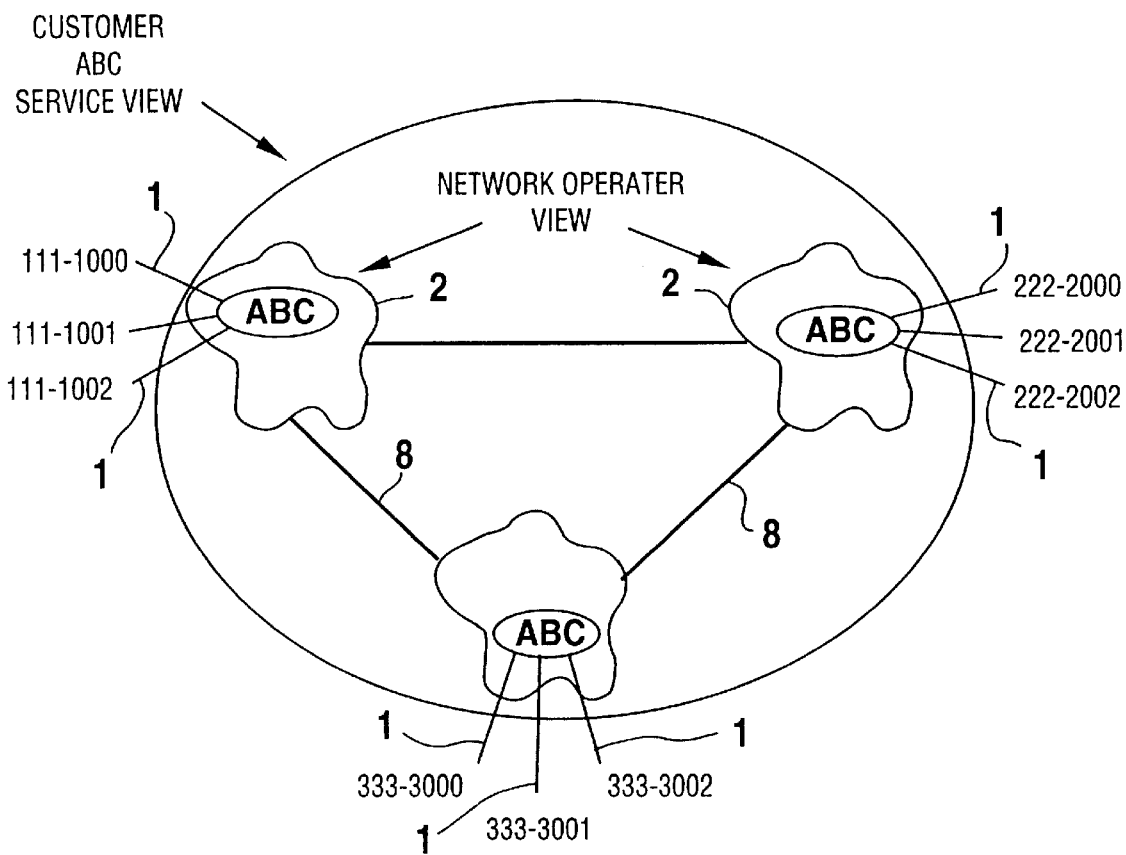
FIG. 1 shows a prior art multi-network system.

Referring to FIG. 1, there exists a customer which has access to circuits 1 in two or more separate networks 2. This customer would like a single interface to manage its circuits. Managing these circuits includes the connection of these circuits 1 (i.e. the customer may want to connect circuit 111-1000 and 333-3000), and obtaining statistics on the performance and availability of the network supplying the services.

The problem today is that there does not exist any way for these customers to do this. For example, if a customer wishes to connect two circuits that reside in separate networks, he or she must contact each of the network vendors of the circuits and request services from each of them. If anything happened to the circuit, the customer would not know in which network the problem exists.

In accordance with the invention, the novel network architecture allows service providers to provide network services that span more than one network.

Figure 2:
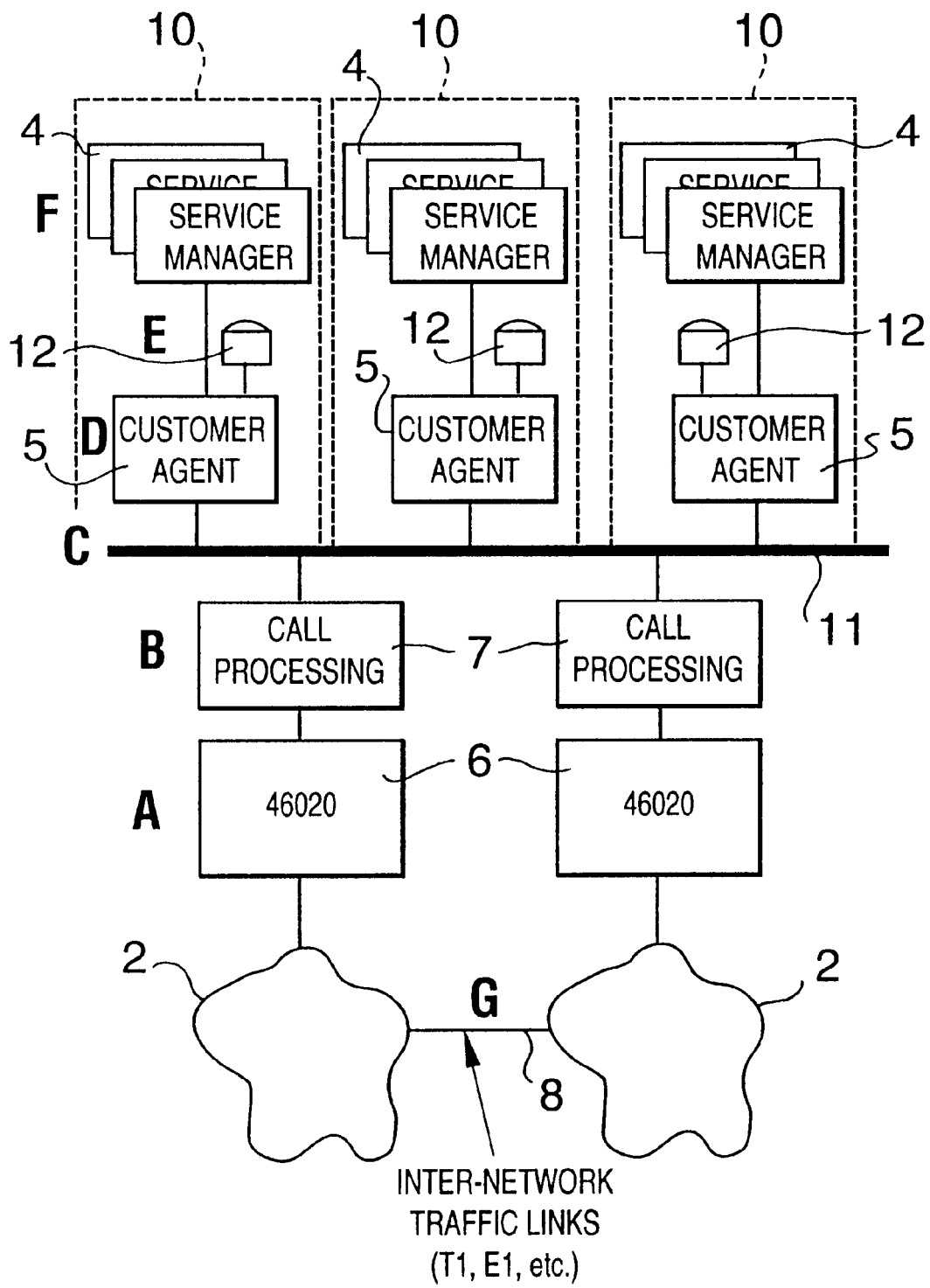
FIG. 2 shows a multi-network system incorporating multi-network service managers in accordance with the invention.

FIG. 2 shows the major components that make up a Multi-Network service manager.

In FIG. 2, a service manager 4 (F) is located at each customer premises 10. The service manager 4 includes an interface through which the customer can access all his network services which come from multiple networks. The customer need not be aware that there are multiple networks that make up these network services.

Each customer has a customer agent 5 (D) assigned to him. There is one customer agent 5 for each customer regardless of the underlying networks that the customer has end-points in. The customer agent 5 includes a database 12 containing information concerning the Network Identifiers from which elements, such as circuit, actually reside. This information can help the customer agent 5 correlate events from various networks. It also stores the E164 addresses of the circuits. The customer agent 5 communicates with the service manager via SNMP protocol.

The customer agents 5 communicate over a control network 11 that is common to all the different networks 2 for the purpose of exchanging control information.

Each network 2 is associated with its own network manager 6, for example a Newbridge Networks Corporation Mainstreet® 46020, which is responsible for controlling the network. The network manager 6 partitions the network into virtual service networks (VSN). A specific VSN contains those circuit endpoints which are assigned to a customer for that particular network. Each network manager 6 is connected to a call processing unit 7 connected to the common control network 11.

The Newbridge network managers 6 supply the customer agents 5 over the control network 11 with the information necessary for them to implement the supported MIBs and standard extensions to those MIBs. The protocol between the customer agents 5 and the network managers 6 can be a standard protocol, such as CMIP, SNMP, etc.

The call processing units 7 (B) are responsible for the routing of PVCs (Permanent Virtual Connections) over the Inter-network links 8, i.e. they select a link between two networks for a PVC to ride on and issue appropriate instructions to the network manager 6. The protocol to used for this component is SS7.

Figure 4:
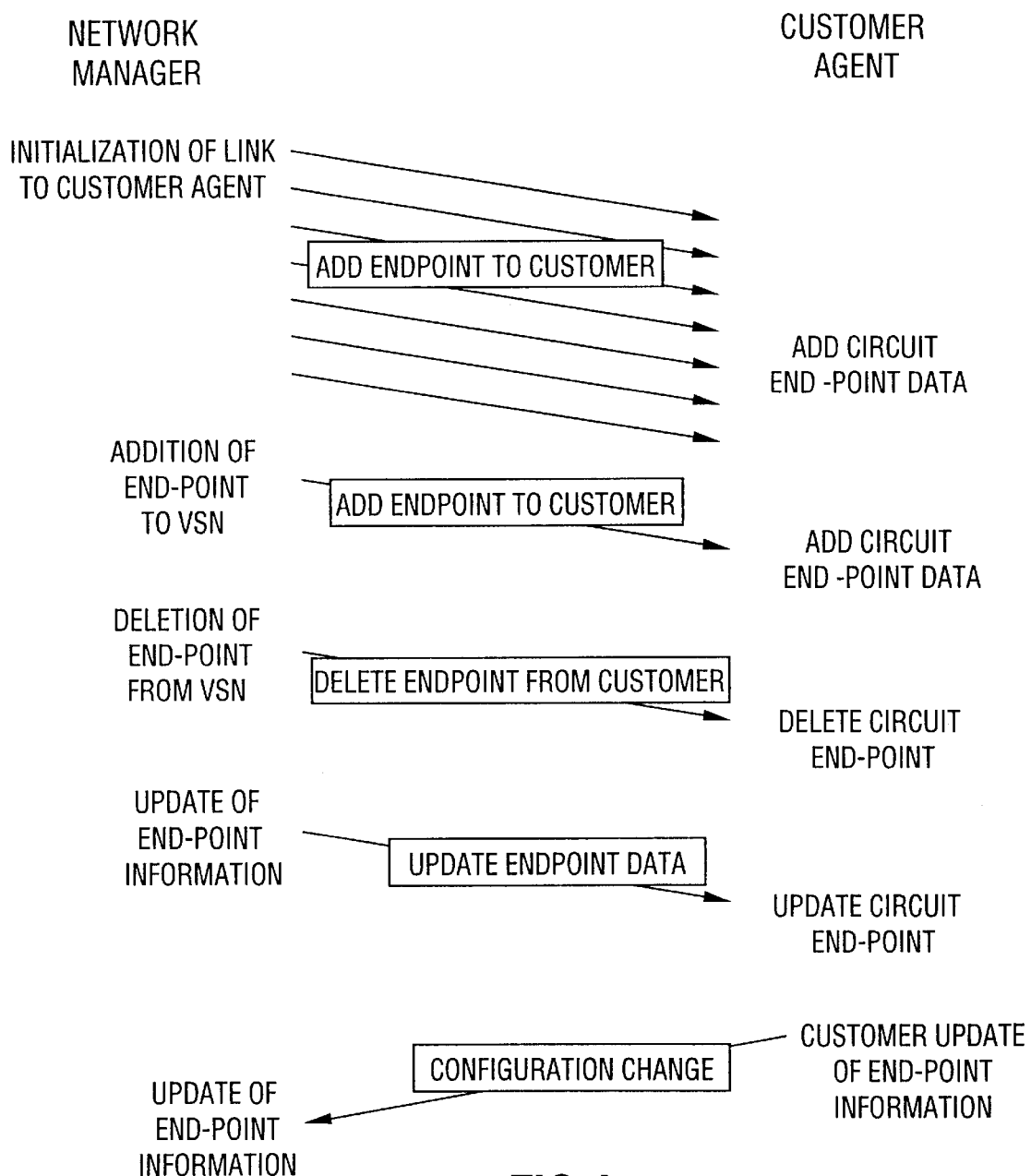
FIG. 4 illustrates the flow of information from a network manager to a customer agent.

Each network management system 6 is configured such that there is a customer agent associated with each VSN. The network management system sends configuration, state and performance (statistical), and fault data regarding the circuit end-points in a VSN to the associated customer agent. In this way a customer agent can consolidate this information from a number of network management systems in order to maintain information about all customer circuit end-points regardless of which network they are located in. The network management systems notify the customer agents of any changes to such information immediately. FIG. 4 illustrates the flow of information from a network manager 6, such as the 46020, to a customer agent 5.

Figure 5:
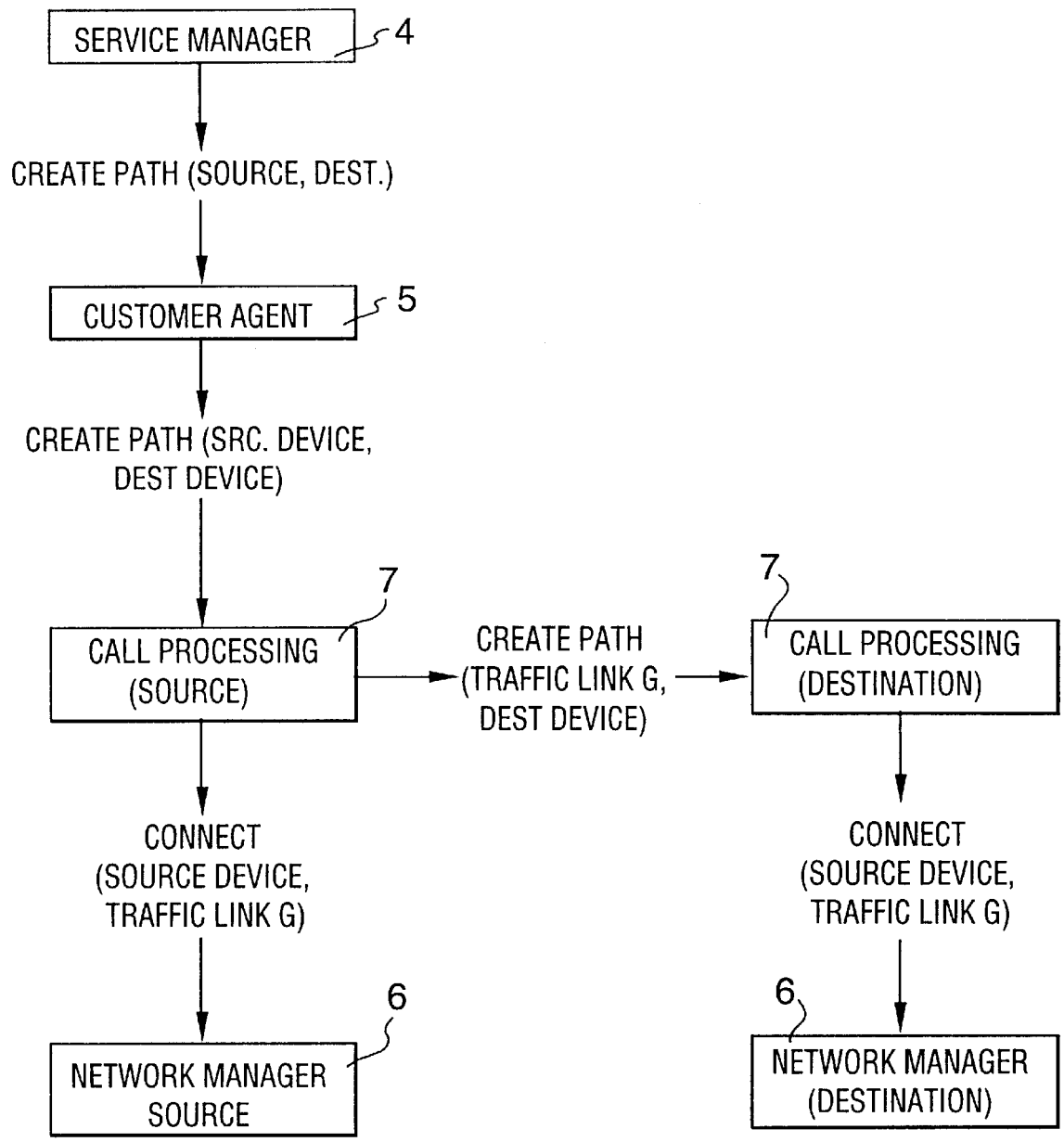
FIG. 5 shows the creation of a path in a multi-network.

FIG. 5 illustrates how an end customer can create, delete and monitor paths between circuit end-points.

First, a service manager 4 at a customer premise requests a list of idle circuit end-points from its associated customer agent 5. The service manager 4 selects the two available circuit endpoints (source and destination) that are to be interconnected and sends a "Create Path" request to the customer agent 5 specifying the circuit end-points by their network address (E. 164) or equivalent) and any path related parameters such as the data speed.

The customer agent 5 then validates the request and translates the source and destination circuit addresses into which physical network devices these addresses represent it, and forwards the request to the call processing unit 7 associated with the source network 2.

The source call processing unit 7 determines which inter-network traffic Link 8 should be used to create a path to the destination network.

Having determined which traffic link to use, the source call processing unit selects which bandwidth on the link 8 is to be used. It then instructs the associate network manager to connect the source circuit end-point to the inter-network traffic link 8.

The source call processing component then sends a create path request to the call processing unit associated with the destination network giving the source as inter-network traffic link 8 and the destination as the originally specified customer circuit end-point.

Finally, the destination call processing component instructs its associated network manager to make the connection from 8 to the destination end-point. At that point, the circuit is complete.

To take an example, supposing customer ABC has been allocated circuits from 3 separate networks. The allocation of the circuits is carried out from the VSN partitioning system provided in network manager 6. This system allows the definition of the customer (i.e. the VSN name) and the allocation of circuits to that customer (i.e. add a circuit to a VSN partition).

The customer, via a service management agent 8, now has the capability to request service from the customer agent 5 (i.e. request that two circuits be connected). The customer agent can now request the call process unit 7 to connect the two circuits over the common control network 11.

The call processing system attempts to route the call, requesting physical connections from various 46020s (i.e. different networks) to provide data flow between the circuits.

In order to better understand the invention, network operations in this context can be viewed as being composed of two distinct components. First, the physical equipment and links must be installed and placed into and active state. This is called network management. The second major component is that of service provisioning where that equipment is assigned or allocated to providing a particular end user service.

Traditionally, it has been possible to assume that the responsibility for equipment and service provisioning were in fact the same organization. For example, the Newbridge Networks Corporation 46020 interfaces reflect this view in that both functions are closely linked. However, in the multi-network situation, this is not true. Each network operator is clearly responsible for the equipment and facilities that they have provided. Service provisioning is done by the end-user or may be provided by one of the network operators. The linkage between the equipment management functions and the service provisioning functions must be broken in order to deal with this situation.

Several examples will now be considered.

In a first example, two or more network operators have formed a consortium. Inter-network links are provided between the networks. End-customers have terminations in one or more of the networks.

Each customer uses one of the network operators as their administrative or prime contact. Requests for service changes all go to that operator. The operator looks after any arrangements with the other operators such as equipment/facility installation and will establish the connections.

Customer connections can span networks and can tandem through a network as needed.

Each network operator wishes to allocate bandwidth in their network to the consortium. They will for instance want to control the amount of bandwidth of their overall network allocated to tandem traffic.

Some examples of these consortiums are Stentor, FNA and NYNEX (NY Tel and NE Tel).

In a second example, a network operator is a member of several consortiums. In the US, an RBOC might form consortiums with several different interexchange carriers (IXCs) and other RBOCs. A given customer could have terminations in different consortiums. Further the customer prime has an opportunity to do least cost routing over the IXC networks in order to minimize their costs. This may also come about where different consortiums may be formed to offer different services (TDM, Frame Relay, ATM, etc.).

In a third example, a multi-network includes both public and private networks. In this scenario, a customer has its own private Newbridge network. The customer wants to make use of a public network such as Enterprise to interconnect sites using the "on demand" capabilities for establishing bandwidth in near real-time.

A fourth example is the reverse of the above example, where a customer wishes to outsource management of their network to a public network operator.

Each of the individual networks is managed by a network operator. This is called "network management". Network management is concerned with physical hardware components and their interconnections (links). A given network manager has no visibility into other networks. They are aware of the inter-network links though only as network end-points. The functions performed by a network manager are:

Within a network, it is expected that the network manager can cause connections between end-points to be created.

If a fault occurs within a network, then that fault must be detected and where possible must be corrected by rerouting.

The network must be monitored at periodic intervals for traffic and fault information.

End users must have a mechanism for requesting connections from the set of networks that they have access to. This mechanism is called call service management. A user requests that two generic addresses (E.164 or equivalent) be connected. Service management must validate that the connection request makes sense, that the end-points are compatible and that the user has permission to make the connection. The user may have the ability to configure the connection end-points.

A key requirement of the multi-networking scheme is that there be a way to uniquely identify network endpoints that is not network or worse equipment based. It is not reasonable to expect all networks to understand the addressing quirks of all other networks. As a result, a common network independent addressing scheme is needed. The E.164 addresses are a very reasonable instance of such a scheme.

User requests for connections are expressed in terms of these addresses.

Figure 3:
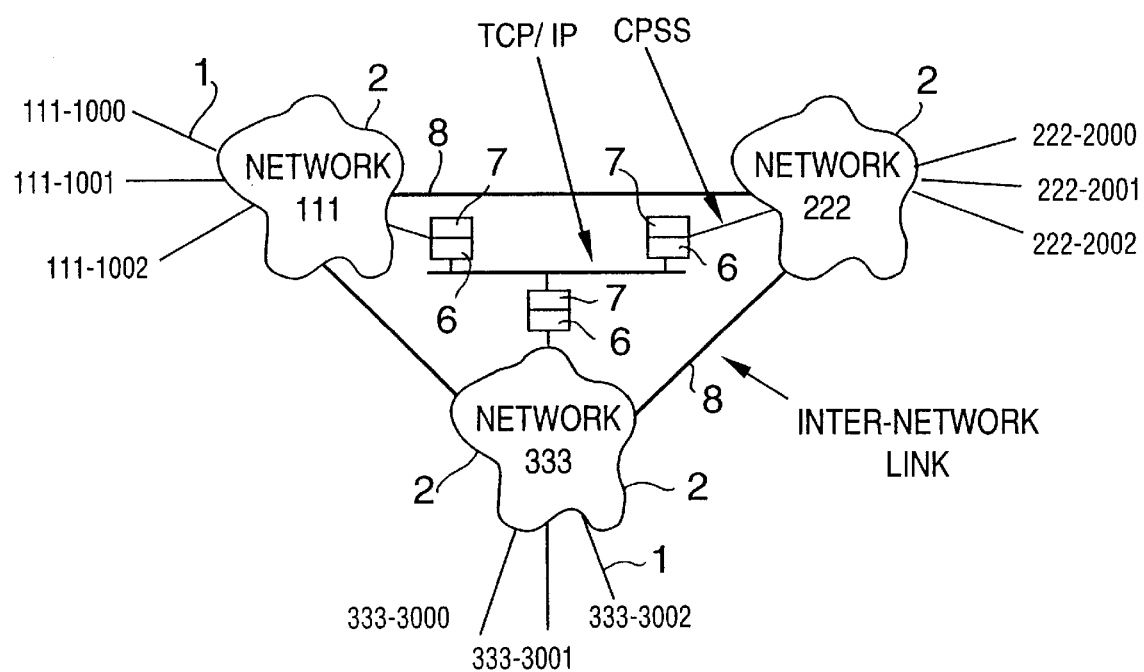
FIG. 3 shows the multi-network system in more detail.

Each network has an associated network management component which is effectively a 4602 with additional applications. Network management components are linked together using TCP/IP over the common control network 11, as shown in FIG. 3.

While a customer may span multiple network provider networks, the service provider will allocate network endpoints to a particular customer. The network provider must create a "closed user group" for each customer that they are dealing with. This is absolutely necessary as a security issue. The 4602 provides a very convenient way to accomplish this through Virtual Service Networks (VSN). A VSN partition will be created for each customer that the network operator is dealing with. All endpoints which are to be allocated to that customer will be placed into that VSN.

A customer may now have VSNs created for them in multiple networks.

Internetwork traffic links are NOT generally part of a customer VSN. They will be allocated to a customer at service provisioning time.

The call processing unit 7 provides the intelligence for linking the various networks. There will be one such instance per 46020 and it is expected to run on the same hardware platform. It has knowledge of the other network call processing entities in the network. It also has knowledge of the inter-network links.

When a connection is initiated, the call processing (CP) unit 7 uses its routing tables to select a route which is a set of Internetwork links and of course the two connection endpoints. It causes those connections to be setup by communicating with the call processing unit for those networks. A connection across a particular network will be accomplished by the call processing agent by having it create a call with the appropriate parameters in the network manager (4602) and then connecting the call.

The interface between call processing modules must be well defined. It may, for example, be a variant on Q.931 or SS7. This allows a degree of openness to the architecture such that other equipment and management architectures could be used to provide transport functions (SONET, DACS, etc.).

A customer will be have one and only one customer agent. That agent will acquire knowledge of the endpoints that make up that customer's domain from the individual networked 46020s. The only information that is retained is the address of the endpoints. When the customer is created or under error conditions, the agent will refresh that view from the network managers 6 using queries on the various 46020 databases. By using the change notifier, it can then track additions/deletions from the set of customer endpoints as a result of network operator actions.

It must also retain knowledge of the multi-network connectivity that a customer has requested. Port to port connections are created through use of a network call processing unit.

Although, in FIG. 2 the customer agents 5 are shown as separate from the 4602/CP and from each other. They can of course be deployed in any number of physical platforms as needed.

The interface from the customer agent to the network manager 6 can be a client/server database interface (SQL).

This does mean that the customer end-points for a customer network must be managed by a network manager.

This is a tool for the service user. This function may however be provided by the service provider. A user is presented a VSN type view of their network composed of all of the ports that have been assigned to them. They may configure port parameters and may connect ports. The service user need not be aware of which network the ports physically reside in.

The user interface also allows the end-user to organize the ports into groups like folders on a Mac so that the user can impart some order to their network. There are a variety of methods that might be used to build this product, but using a "standard" network manager such as HP OpenView would probably be a very attractive option.

All communication from this unit is to the customer agent associated with the customer. A given customer agent can support multiple CSMs.

It is also necessary that a single platform be able to support multiple instances of the service manager for the situation where a network operator is providing the service management of a number of customers from a single station.

The interface to the customer agent can be either a proprietary interface based around remote SQL RPCs or can be via SNMP with a Newbridge MIB such that a standard SNMP manager can get information from the agent.

A single network is currently limited in size by the capacity of a single 4602 network manager and other related issues such as CPSS networking limits. There are a number of programs underway to address all of these limits with the intent that a single network can be grown to whatever size is needed.

However, there are a number of significant technical challenges in doing this. The architecture described above is capable of solving a subset of the very large network problem. A single network operator can sub-divide their network into interconnected regional networks. The customer agent and customer service manager can then provide the end-to-end service model.

We claim:

1. A multi-network architecture comprising a plurality of different digital networks with a network manager associated with each network, characterized in that it further comprises a common management network for said different digital networks; a service manager located at each customer premises comprising an interface responsive to customer input, said service manager issuing instructions to request a desired service across the plurality of networks; customer agents associated with said service managers and connected to the common management network, said customer agents including a database containing data about the networks accessible to its associated customer, and based on said data and instructions received from its service manager, said customer agent issuing routing instructions for the required networks over said common management network; and a call processing unit associated with the network manager of each network, each said call processing unit being connected to the common management network and receiving routing instructions from a said customer agent via said management network; whereby said customer agents can directly route a call through the plurality of networks.

2. A multi-network architecture as claimed in claim 1, characterized in that the call processing unit selects a link between different networks to establish a connection between end-points in different networks.

3. A multi-network architecture as claimed in claim 2, characterized in that circuits are stable in said digital network the database of the customer agent stores information concerning network identifiers indicating in which network said circuit reside.

4. A multi-network architecture as claimed in claim 2, characterized in that the customer agent stores the addresses of said circuits.

5. A method of managing calls over multiple networks, each associated with a network manager, comprising the steps of assigning a service manager and customer agent to each customer, said service manager providing a customer interface to permit said customer to request a desired service and said customer agent including a database containing data about the networks accessible to the customer, connecting the customer agents to a common management network spanning said multiple networks, connecting the network managers of said multiple networks to said common management network by means of respective call processing units, and establishing a call through said multiple networks by means of instructions issued over said common management network to said call processing units associated with the network managers thereof.

6. A method as claimed in claim 5, characterized in that the service manager selects available circuit end-points and issues a request to the associated customer agent which validates the request and translates the end-point addresses into physical network devices that these addresses represent.

7. A method as claimed in claim 6, characterized in that the customer agent forwards the request to a source call processing unit which determines which internetwork link should be used to create a path to the destination end-point.

8. A method as claimed in claim 7, characterized in that the customer agent also forwards the request to a destination call processing unit which instructs its associated network manager to establish a path from the incoming internetwork link to the destination address.

* * * * *